United States Patent Office 3,008,793
Patented Nov. 14, 1961

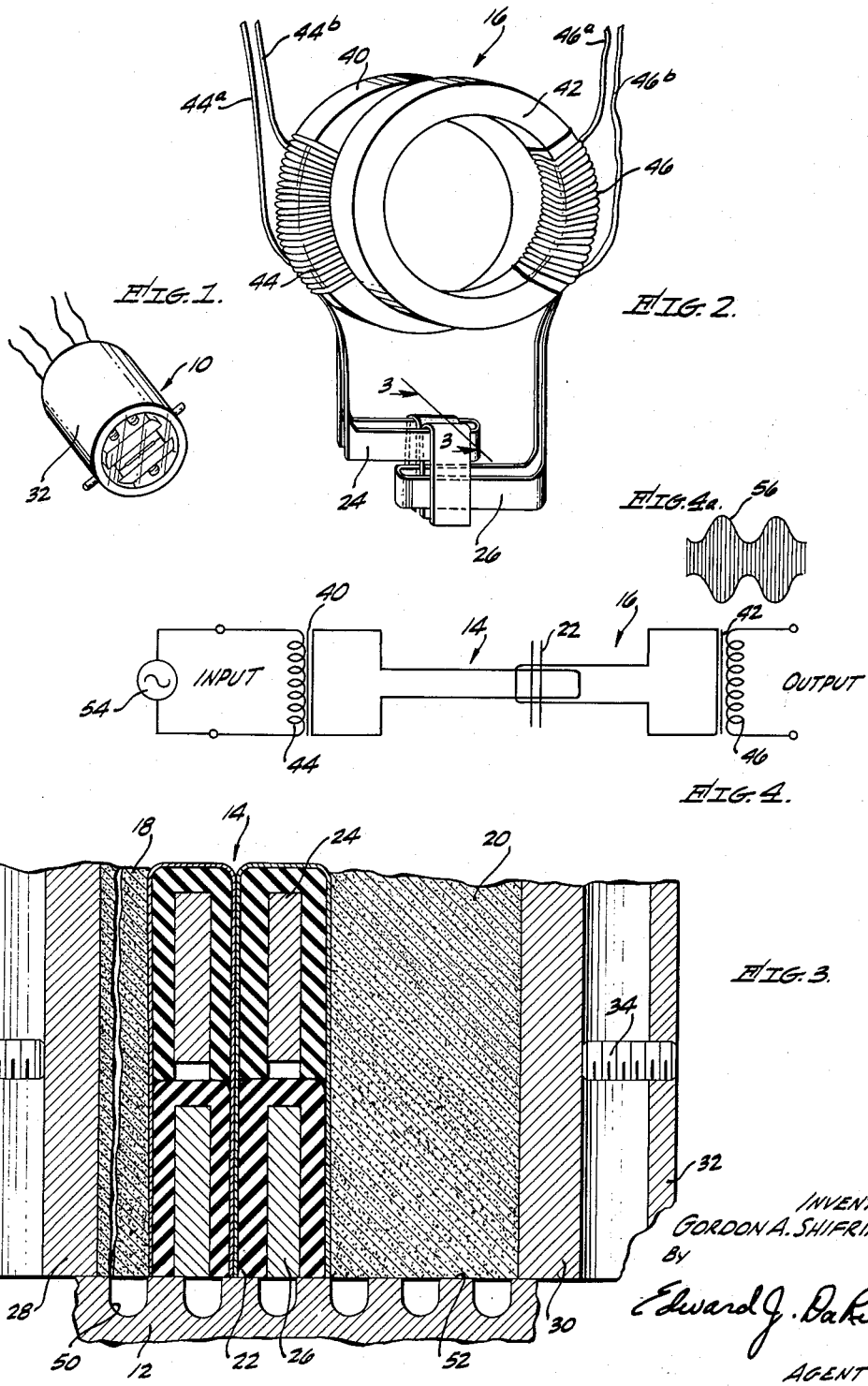

3,008,793
VARIABLE COUPLING ELECTROMAGNETIC DEVICE
Gordon A. Shifrin, Torrance, Calif., assignor to Hughes Aircraft Company, Culver City, Calif., a corporation of Delaware
Filed Jan. 2, 1958, Ser. No. 706,741
4 Claims. (Cl. 346—74)

This invention relates generally to electromagnetic devices and more particularly to devices of this general type suitable for detecting incremental physical displacements.

This invention is an improvement over a copending application of D. F. Brower, Serial No. 588,711, filed June 1, 1956, entitled "Variable Reluctance Electromagnetic Device" and assigned to the same assignee as this invention. This application is now Patent 2,897,462, dated July 28, 1959.

It is, therefore, a general object of this invention to provide an improved electromagnetic type of incremental displacement detector for use with a grooved scale of magnetic material in which the electrical indications denote physical increments and without resorting to any associated bridge or balancing networks.

It is a further object of this invention to provide an improved electromagnetic detector of the type recited in the preceding object utilizing a pair of magnetically coupled coils on the sensing probe thereof in which the scale variations serve to vary the magnetic coupling between the two coils.

It is another object of this invention to provide an improved electromagnetic device of the character referred to which is rugged, easily manufactured, easily adjusted, and is relatively insensitive to vibration and shock.

It is yet another object of this invention to provide an improved incremental displacement detector comprising a three legged core having a pair of coils disposed about a foil thick center leg and adapted for use with a magnetic track having discrete zones of differing magnetic characteristics whereby the zones are resolved through the variable coupling of said coils afforded by the zones at the center leg only.

For a better understanding of the invention together with other and further objects thereof, reference is made to the following description taken in conjunction with the accompanying drawings given by way of example wherein:

FIG. 1 is an isometric view of an electromagnetic detector head embodying the invention;

FIG. 2 is a partial enlarged view of the electromagnetic detector head showing the coupling of the coils to the center leg of the magnetic core and their associated transformers;

FIG. 3 is an enlarged sectional view of the electromagnetic head taken along the line 3—3 of FIG. 2 with portions broken away and showing the outer legs of the magnetic core positioned with respect to an engraved scale;

FIG. 4 is a schematic representation of the electrical circuitry of the electromagnetic head; and FIG. 4a is a graphical representation of a typical output signal derived from the electromagnetic head.

The complete detector head is shown in FIG. 1. A head embodying the principle of operation of the head shown in FIG. 1 is described in the aforementioned copending application of D. F. Brower and also in another copending application of D. F. Brower, Serial No. 533,602, filed September 12, 1955, entitled "Twin Gap Recording Head" and assigned to the assignee of this invention; and will be described herein only to the extent necessary to afford an understanding of the present invention.

The electromagnetic detector 10 of this invention is shown in the accompanying drawings as used with a magnetic medium 12 having discrete adjacent zones of differing magnetic characteristic. The detector assembly comprises two substantially independent magnetic circuits generally identified as the detecting circuit 14 and the transformer section 16. The magnetic circuit 14 is a three-legged core assembly comprising two large core sections 18 and 20 of ferrite or other suitable magnetic material constituting the two outer legs of the three-legged assembly and a relatively thin center leg 22 which may be, for example, of some highly permeable magnetic material such as "Permalloy" formable in thin foil thickness in the order of a few ten-thousandths of an inch. A pair of single turn coils 24 and 26 of thin silver foil or other suitable conducting material are disposed about the center leg. The center leg 22 is formed from a single magnetic sheet folded into an M-shaped configuration. The large outer legs or core sections 18 and 20 are placed in abutting engagement with the outer arms of the thus formed M-shaped assembly so as to define the three substantially parallel legs, including the outer legs 18 and 20 and the center leg 22, of the head assembly. A pair of clamping blocks 28 and 30 are arranged in abutting relationship with the outer core legs 18 and 20 on the opposite sides from the Permalloy sheet. A housing 32 which may be of brass or any other electrical shielding material includes the entire head assembly and acts to clamp the ferrite blocks constituting the outer core legs 18 and 20 and the foil together for defining the three legs. The three core sections including outer legs 18 and 20 and center leg 22 are maintained in their relative positions by means of screws or the like connected to the housing 32 and forcing the clamping blocks 28 and 30 inwardly such as indicated by the screw 34 in FIG. 3, to secure the assembly prior to potting. The bottom faces of the core sections or outer core legs 18 and 20 together with the bottom face of the center core leg 22 define pole faces occupying positions in a single plane, which may be accomplished by suitable surface grinding so that the pole faces are substantially perfectly flat. Of course, it will be appreciated that depending upon the character of the surface against which the pole faces 18 and 20 are to operate these surfaces may be ground to any suitable configuration. As clearly shown in FIG. 3, the coil or winding 26, the lowermost of the coils coupled to the leg 22, is set back from the pole faces, to prevent its lower edges from contacting the scale which may short circuit part of or all of the coil.

The magnetic circuit 16 comprises a pair of commercially available toroids 40 and 42. The toroids 40 and 42 are arranged within the head assembly 10 above the detecting circuit 14. Input winding 44 is coupled to the magnetic core 40 and is adapted to be externally energized. The winding 44 may be considered as a primary winding for the single turn core 24. As was previously mentioned, the coil 24 is formed of an electrically conductive foil and is arranged to loop the magnetic core 40 as well as the center leg 22 of the detecting circuit 14. The magnetic core 42 is positioned within the head assembly 10 adjacent to the core 40 and is similarly arranged with a winding 46 functioning as an output winding for the detector head. The winding 46 is also arranged as a transformer with the single turn winding 26. The winding 26 is coupled to the magnetic core 42 by means of a single turn in the same face as the coil 24. The leads 44a and 44b for the winding 44 and the leads 46a and 46b for the winding 46 are brought out of the housing 32 as indicated in FIG. 1. The transformer section 16 is arranged in the detector head 10 to provide a transformed inductance of useable magnitude since the single turn coils 24 and 26 have an extremely low inductance. If desired, the transformer may be built on extensions of the large core sections 4 and 5, following the teachings of the application of D. F. Brower, Serial No. 533,602, referred to above. The complete electromagnetic detector 10 is fragmentarily illustrated in FIG. 3 as used in conjunction with the magnetic scale 12. Here, discrete steps of physical displacement are established by regularly spaced laterally disposed grooves 50 defining lands 52 therebetween. In the illustrated embodiment of this invention, the flat pole faces of the respective legs 18, 20 and 22 are disposed to slide along the flat surface lands of the engraved scale 12. As it may be appreciated from viewing FIG. 3, which in enlarged scale approximately indicates the relative dimensions of the grooves and lands for one mode of operation with respect to the respective pole faces, it will be seen that the pole face defined at the bottom end of the center leg 22 has a width substantially less than the width of the respective grooves 50 and that the pole faces 18 and 20 defined by the respective cores have sufficient width to straddle a plurality of the grooves and lands so that the primary change in magnetic reluctance of the detector magnetic circuit is due to the position of the center core pole face 22 with respect to the grooves and the lands of the scale 12 and is relatively insensitive to variations in position of the pole faces 18 and 20 along the scale 12. Thus, a positive indication of the position of the electromagnetic detector with respect to a groove or a land is obtained.

It will be seen from FIG. 3, that as the center leg 22 is positioned over a land 52 the air gap therebetween is minimal with respect to the position of the leg 22 over a groove 50. It will be appreciated that such a change in the reluctance of the magnetic circuit will be recognized or resolved by the detector only at the leg 22.

With particular reference to the schematic circuit illustrated in FIG. 4, the detecting operation of the detecting circuit 14 will be more fully described. The winding 44 is connected to an external A.C. generator 54 which may provide a signal of the order of 500 kilocycles. The energization of the winding 44 will be effective to produce a magnetic flux in the three legged assembly and which flux is arranged to pass through the magnetic scale 12. The magnetic flux travels through the core sections 18 and 20 in such a manner as to pass through the center leg 22 in an additive relationship so that it is concentrated at the outer extremity of the leg 22 adjacent to the scale 12. In response to the relative physical displacement of the detector 10 and the scale 12 in passing over the lands and grooves, the magnetic coupling of the coils 26 and 24 is varied due to the changes in the air gap or changes in the reluctance in the magnetic circuit. Thus, the flux set up by the generators 54 is coupled to the output winding 46 by means of the coils 26 and 24. The output indicated or signal derived from the winding 46 will be a modulated A.C. signal which corresponds to the displacement of the detector 10 along the scale 12. The output indication may be a 500 kilocycle modulated output having a wave configuration 56 substantially as shown in FIG. 4a.

In practice it has been found desirable to employ two head assemblies in resolving a scale. These are physically displaced with respect to the scale divisions so that the respective output voltages are relatively phase displaced in an amount resulting from a relative physical displacement of the small pole faces of the order of one-fourth of a scale division. The application of suitable digital logic to the output voltages of the heads then results in finer scale resolution and direction sensing.

It will be appreciated from the foregoing consideration that the incremental position or displacement detecting device of this invention offers a number of advantages as outlined in the statements of objects and in the specification as set forth hereinabove.

Although a single embodiment of this invention has been herein illustrated and described, it will be appreciated by those skilled in the art that this invention both as to its details and as to the organization of such details, and additionally as to orientation of groups of detector heads and scales, may be modified without departing from the spirit and scope of the inventive subject matter. Accordingly, it is intended that the foregoing disclosure and the showings made in the drawings shall be considered only as illustrative of the principles of this invention and not to be construed in a limiting sense.

What is claimed is:

1. Electromagnetic apparatus comprising: a track of magnetic material having a surface comprising discrete adjacent zones of differing magnetic characteristic; a core member having at least two legs disposed in substantially parallel relation, the ends of said legs terminating in adjacent pole faces disposed in confronting relation with said surface of said track forming magnetic air-gaps intermediate said pole faces and said surface of said track, said core member and said track being relatively movable to afford effective movement of said core member along said track, one of said legs being of a foil-thick material having high magnetic permeability; a single turn output winding disposed about said one leg adjacent the pole face of said one leg; a single turn input winding disposed about said one leg in a position on said one leg longitudinally displaced from said output winding in a direction remote from said pole face of said one leg; the width of said pole face at the end of said one leg corresponding substantially to the dimension across individual zones and the width of the remaining pole face corresponding substantially to the dimension across a predetermined plurality of adjacent zones, providing variable magnetic coupling of said coils with respect to said zones only at said first named pole face; an input transformer having an output winding connected to said single turn input winding on said one leg; and an output transformer having an input winding connected to said single turn output winding on said one leg.

2. An incremental transducer comprising, a medium of magnetizable material having discrete adjacent zones of differing magnetic characteristic; an electromagnetic head having a two legged core, one of said legs terminating in a pole face having a width less than the dimension across a zone and the other leg terminating in a pole face having a width spanning a plurality of said zones, said two legged core being disposed in flux linkage with said medium, a single turn output winding disposed about said one leg adjacent the pole face thereat, a single turn input winding disposed about said one leg in a position longitudinally displaced on said one leg from said output winding; an input transformer having an output winding connected to said single turn input winding on said one leg; and an output transformer having an input winding connected to said single turn output winding on said one leg.

3. An incremental transducer comprising, a medium of magnetizable material having discrete adjacent zones of differing magnetic characteristic; an electromagnetic head having a two legged core, one of said legs terminating in a pole face having a width less than the dimension across a zone and the other leg terminating in a pole face having a width spanning a plurality of said zones, said two legged core being disposed in flux linkage with said medium, a single turn output winding disposed about said one leg adjacent the pole face thereat, a single turn input winding disposed about said one leg in a position longitudinally displaced on said one leg from said output winding; an input transformer having a single turn output winding connected to said single turn input winding on said one leg; and an output transformer having a single turn input winding connected to said single turn output winding on said one leg.

4. An incremental transducer comprising, a medium of magnetizable material having discrete adjacent zones of differing magnetic characteristic, an electromagnetic head having a two legged core, one of said legs terminating in a pole face having a width less than the dimension across a zone and the other leg terminating in a pole face having a width spanning a plurality of said zones, said two legged core being disposed in flux linkage with said medium, an input winding disposed about said one leg and adapted for alternating current energization to induce magnetic flux in said core and said scale, and an output winding disposed about said one leg to have induced therein voltages depending upon flux variations in said one leg.

References Cited in the file of this patent

UNITED STATES PATENTS

| | | |
|---|---|---|
| 2,694,754 | Connell | Nov. 16, 1954 |
| 2,700,588 | Williams et al. | Jan. 25, 1955 |
| 2,750,579 | Lekas et al. | June 12, 1956 |
| 2,799,835 | Tripp et al. | July 16, 1957 |
| 2,840,440 | McLaughlin et al. | June 24, 1958 |
| 2,902,765 | Chater | Sept. 8, 1959 |
| 2,914,756 | Heidenhain et al. | Nov. 24, 1959 |